(12) United States Patent  (10) Patent No.: US 6,976,859 B2
Blackwell  (45) Date of Patent: Dec. 20, 2005

(54) DISPLACEABLE CARD GUIDE FOR HIGH PACKING RATIO HOUSINGS

(75) Inventor: Donald A. Blackwell, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/764,045

(22) Filed: Jan. 23, 2004

(65) Prior Publication Data

US 2004/0228597 A1    Nov. 18, 2004

Related U.S. Application Data

(60) Provisional application No. 60/470,835, filed on May 15, 2003.

(51) Int. Cl.[7] ...................... H01R 13/62; H01R 13/625
(52) U.S. Cl. ...................... 439/157; 439/342
(58) Field of Search ................ 439/157, 152, 439/159, 160, 342

(56) References Cited

U.S. PATENT DOCUMENTS

| | | | |
|---|---|---|---|
| 5,003,431 A | * | 3/1991 | Imsdahl ...................... 361/798 |
| 5,030,108 A | * | 7/1991 | Babow et al. ................ 439/64 |
| 5,238,423 A | * | 8/1993 | Hillis et al. ................. 439/259 |
| 5,691,504 A | | 11/1997 | Sands et al. |
| 5,868,585 A | * | 2/1999 | Barthel et al. .............. 439/377 |
| 5,980,281 A | * | 11/1999 | Neal et al. .................. 439/157 |
| 6,493,233 B1 | | 12/2002 | De Lorenzo et al. |
| 6,731,510 B1 | * | 5/2004 | Hwang et al. .............. 361/754 |
| 6,741,477 B2 | | 5/2004 | Sivertsen |

* cited by examiner

*Primary Examiner*—Chandrika Prasad
(74) *Attorney, Agent, or Firm*—Workman Nydegger (57) ABSTRACT

Displaceable card guides for use with high packing ratio housings for network tap modules. The housing allows the user to maintain all network taps in any given system in one housing and location. This increases the ease of maintaining multiple network taps and allows the network tap modules to be powered by a power supply included with the housing. The displaceable card guides enable a set network tap modules to be housed in a single housing with negligible or no spacing between adjacent modules. In addition, these card guides the associated housing are generally applicable to a number of other types of modular electrical or optical components.

8 Claims, 10 Drawing Sheets

DISPLACEABLE CARD GUIDE FOR HIGH PACKING RATIO HOUSINGS

RELATED APPLICATIONS

The present application claims priority to U.S. Provisional Patent Application Ser. No. 60/470,835, with a filing date of May 15, 2003 entitled "DISPLACEABLE CARD GUIDE FOR HIGH PACKING RATIO HOUSINGS," which is incorporated herein by reference in its entirety.

BACKGROUND OF THE INVENTION

1. The Field of the Invention

The present invention relates to housings for network taps or other modular electrical or optical components. More specifically, the present invention relates to retractable card guides in such housings for increasing the card guide density or packing ratio.

2. The Relevant Technology

In recent years, it has become increasingly important to have the ability to monitor and analyze the data flow in communication channels between and within networks. Some of these reasons include monitoring the communication channel for certain types of data, identifying and diagnosing network problems, detecting interruptions in the communication channel, detecting degradation in the communication channel, and the like. Thus, network taps, which are systems for tapping into communication lines, have been developed. In general, a network tap is a device that is positioned in-line in a network communication line and enables network analyzers or other devices to have access to a copy of the data transmitted over the communication line. A network tap is typically installed by physically cutting or breaking a network cable and positioning the tap between the two ends of the network cable. Once the tap is installed, network analyzers or other devices can access the network data without having to manipulate the network cable or altering the topology of the network. Moreover, conventional network taps enable access to the network data without disrupting or modifying the network data or the topology of the network.

Systems using conductors composed of metallic materials such as copper or other low resistance metals have generally been relatively easy to monitor and evaluate without great disruption or intrusion into the communication channel since current flows throughout the entire conductor and portions of the conductor can be externally tapped with another conductor attached to the test equipment that bleeds off a negligible amount of test current.

Additionally, optical fibers that transmit light have also been used as a communication channel medium and have proven to be advantageous for the transmission of large amounts of information, both in digital and analog form. Optical fibers, unlike metallic conductors, propagate the information signal in a constrained directional path. Furthermore, the optical signal propagates primarily in a relatively narrow internal portion of the conductor, making non-intrusive external tapping of the fiber impractical. Therefore, in order to monitor data transmitted on an optical fiber, a splitter, also known as a coupler, must be placed in-line with the optical fiber to reflect a portion of the light from the main optical fiber to another optical fiber that can be coupled to a network analyzer or other test equipment.

Existing network taps typically are housed within a module including a faceplate through which various connections may be made. For example, the network tap module may include a set of in-line pass through connections to allow the tap to be positioned in line with the network (e.g. an "in" and "out" connection) in addition to one or more connections which allow a user to tap into the network for analysis purposes. Existing network tap modules also include a connector for receiving power, typically at the rear of the module.

Each network tap module allows the user to tap into the network at one specific location or on one selected cable or communication link between nodes in a network. Often, it is desirable to tap into the network at multiple communication links. To do this, a separate network tap must be inserted into each communication link to be accessed. Multiple taps also facilitate accessing and monitoring multiple channels that carry network data. Because each network tap module must be connected to a power supply, this can result in a system of network tap modules spread throughout a network, each module connected to its own power supply.

It would be advantageous to have a system for conveniently managing and storing a set of network tap modules. Any reduction in the space required for maintaining a set of network tap modules would be beneficial. In addition, such techniques for storing a set of network tap modules would also be applicable to any of a number of different types of electrical and optical cards or modules.

BRIEF SUMMARY OF THE INVENTION

The present invention is directed to a displaceable card guide for use with high packing ratio housings for network tap modules. The housing allows the user to maintain all network taps in any given system in one housing and location. This increases the ease of maintaining multiple network taps and allows the network tap modules to be powered by a power supply included with the housing. The displaceable card guides enable a set of network tap modules to be housed in a single housing with negligible or no spacing between adjacent modules. In addition, the principles of the invention are generally applicable to a number of other types of modular electrical or optical components.

The displaceable card guides are mounted inside the housing, which also includes a chassis and a power supply. The card guides allow the network tap modules to be closely packed, while still providing a surface to guide each module as it is inserted into the housing. This results in the housing being capable of a high packing ratio.

According to one embodiment, each displaceable card guide includes a base, two retractable arms, and a guide. The base may be attached to the inside roof of the chassis. A first end of each retractable arm is attached to the base, while a second opposite end of each arm is attached to the guide. As a network tap module is inserted into a housing with the displaceable card guides, the module contacts the leading edge of the guide, which may be sloped. This contact continues as the module is pushed into the chassis of the housing. The retractable arms progressively retract to a final position. Thus, the displaceable card guides have two primary positions, including an extended position in which the tap module position associated with the card guide has not received a tap module, and a retracted position, in which the position associated with the card guide has received a tap module.

The displaceable card guides eliminate the need for interior walls or other such guides that would physically separate adjacent network tap modules when the modules are inserted into the housing. Elimination of such structures allows the housing to have a high packing ratio. Such structures are also difficult to manufacture and subject to being easily damaged due to their high aspect ratio.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

The displaceable card guide of the present invention is used with high packing ratio housings for network taps. The housing allows the user to maintain a plurality of network taps in any given system in one housing and location. This increases the ease of maintaining multiple network taps and allows the network tap modules to be powered by a power supply included with the housing. According to the invention, the displaceable card guides enable a set of network tap modules to be housed in a single housing with negligible or no spacing between adjacent modules. In addition, the principles of the invention are generally applicable to a number of other types of modular electrical or optical components.

Examples of the related housing and the adapters that can be used in connection with this invention are described in detail in U.S. Provisional Patent Application Ser. No. 60/470,610, entitled "HOUSING FOR HOT PLUGGABLE NETWORK TAPS", filed May 15, 2003; U.S. Provisional Patent Application Ser. No. 60/508,532, entitled "HOUSING FOR HOT PLUGGABLE NETWORK TAPS", filed Oct. 2, 2003; U.S. patent application Ser. No. 10/764,592, entitled "HOUSING FOR HOT PLUGGABLE NETWORK TAPS", filed on the same day as the present application; United States Provisional Patent Application Ser. No. 60/470,582, with a filing date of May 15, 2003 entitled "HOT PLUGGABLE ADAPTER FOR LEGACY POWER SUPPLY CONNECTORS;" and U.S. Provisional Patent Application Ser. No. 60/508,334, with a filing date of Oct. 2, 2003 entitled "HOT PLUGGABLE ADAPTER FOR LEGACY POWER SUPPLY CONNECTORS," each of which is incorporated herein by reference in its entirety. In addition to the displaceable card guides, the housing includes a chassis and preferably a shared power supply, each of which are described in detail in the foregoing patent applications that have been incorporated herein by reference.

Figure 1:
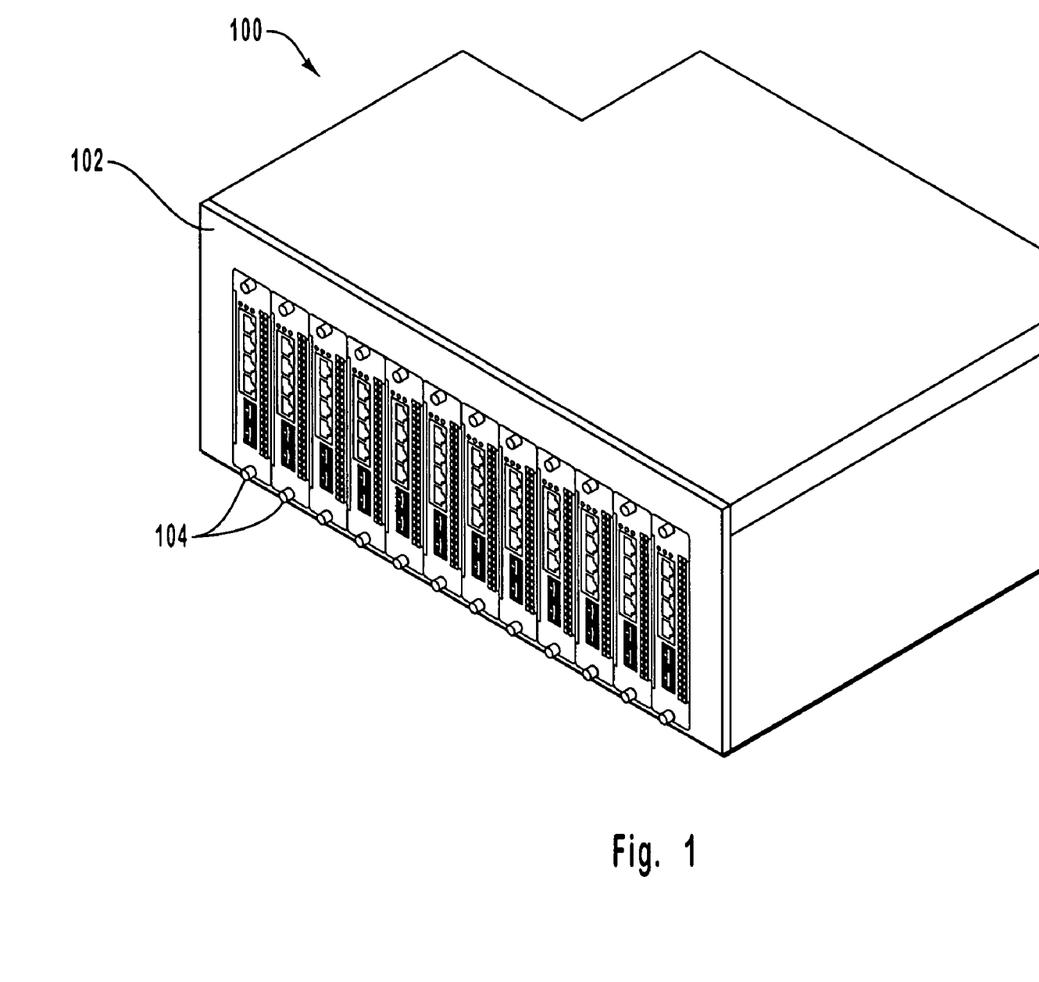
FIG. 1 is a perspective view of an embodiment of the housing of the present invention.
Figure 2:
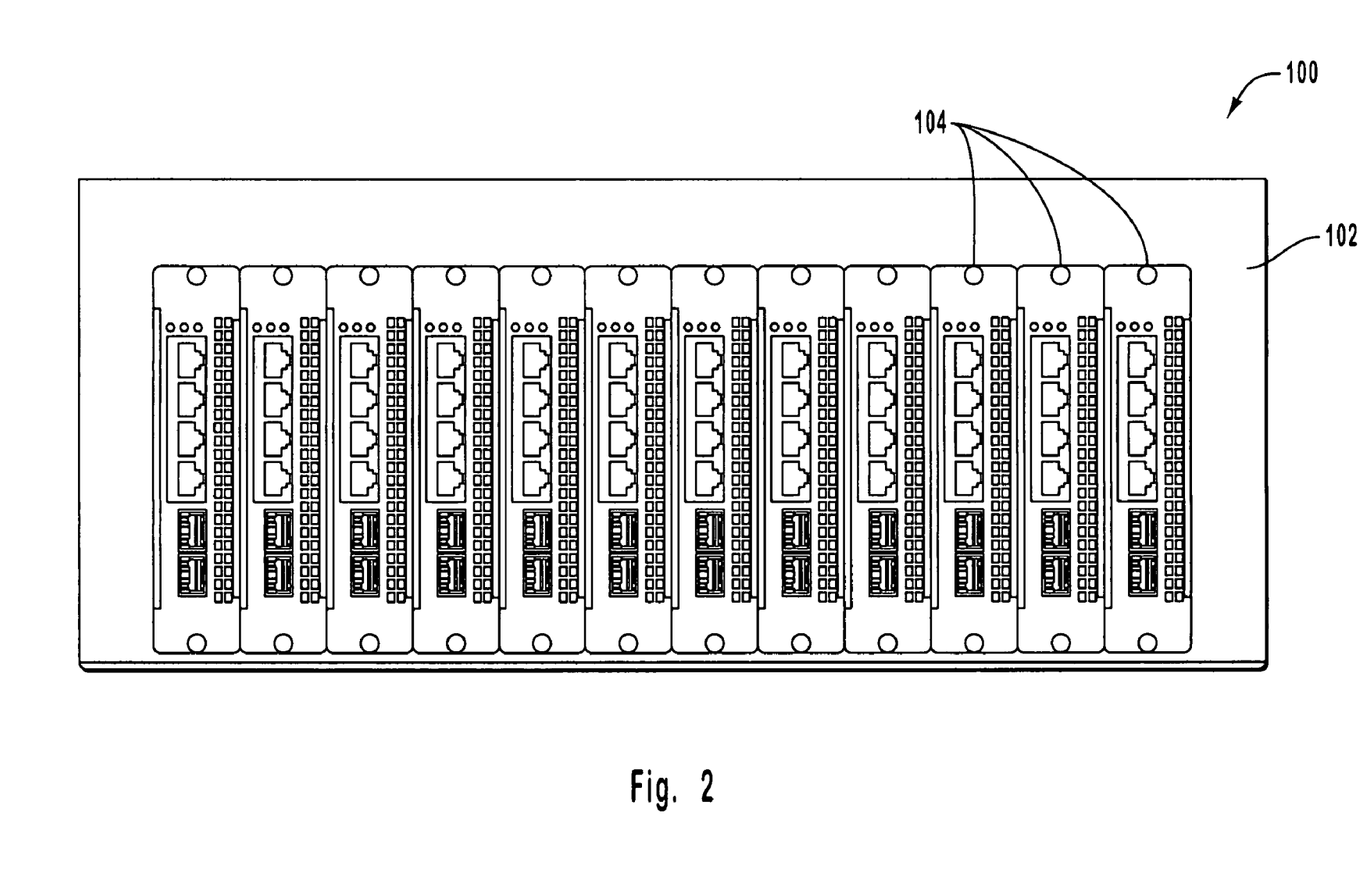
FIG. 2 is a front view of the embodiment of the housing of FIG. 1 with the housing filled with network tap modules.
Figure 3:
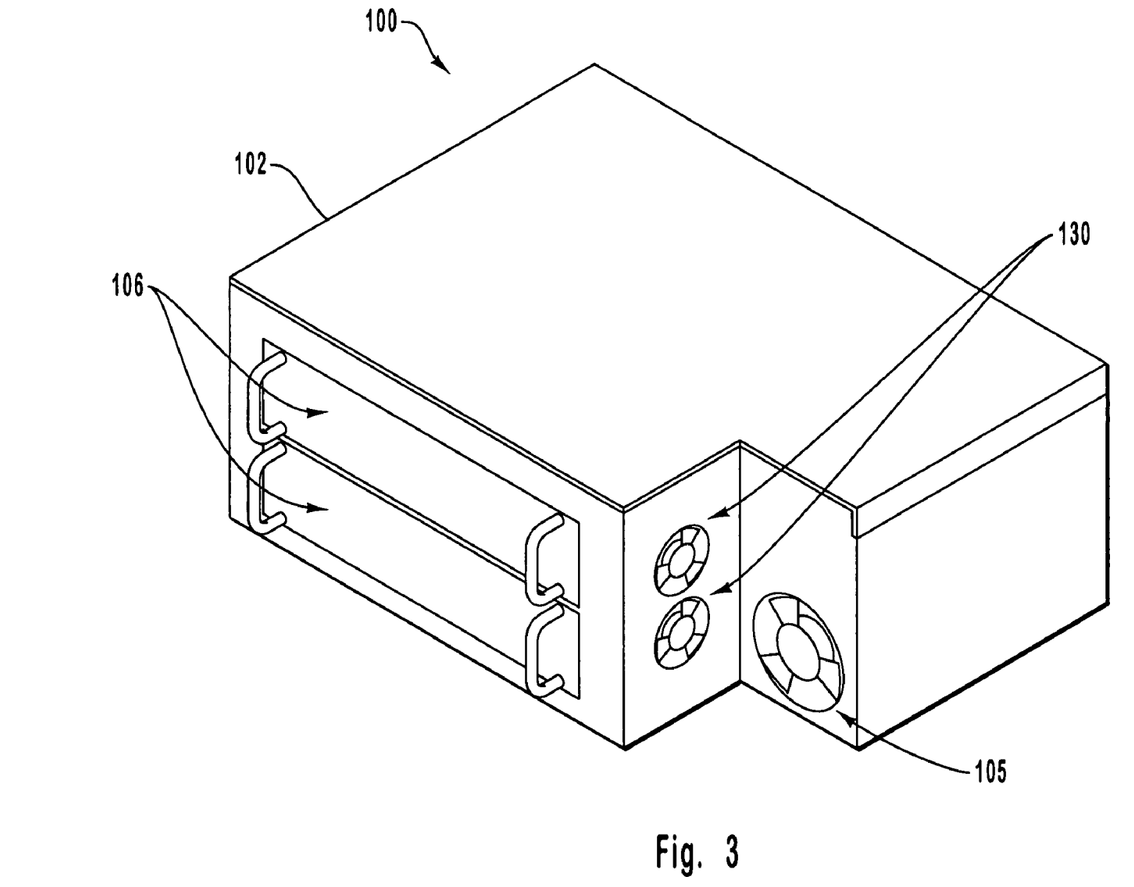
FIG. 3 is a rear perspective view of the embodiment of the housing of FIG. 1.
Figure 4:
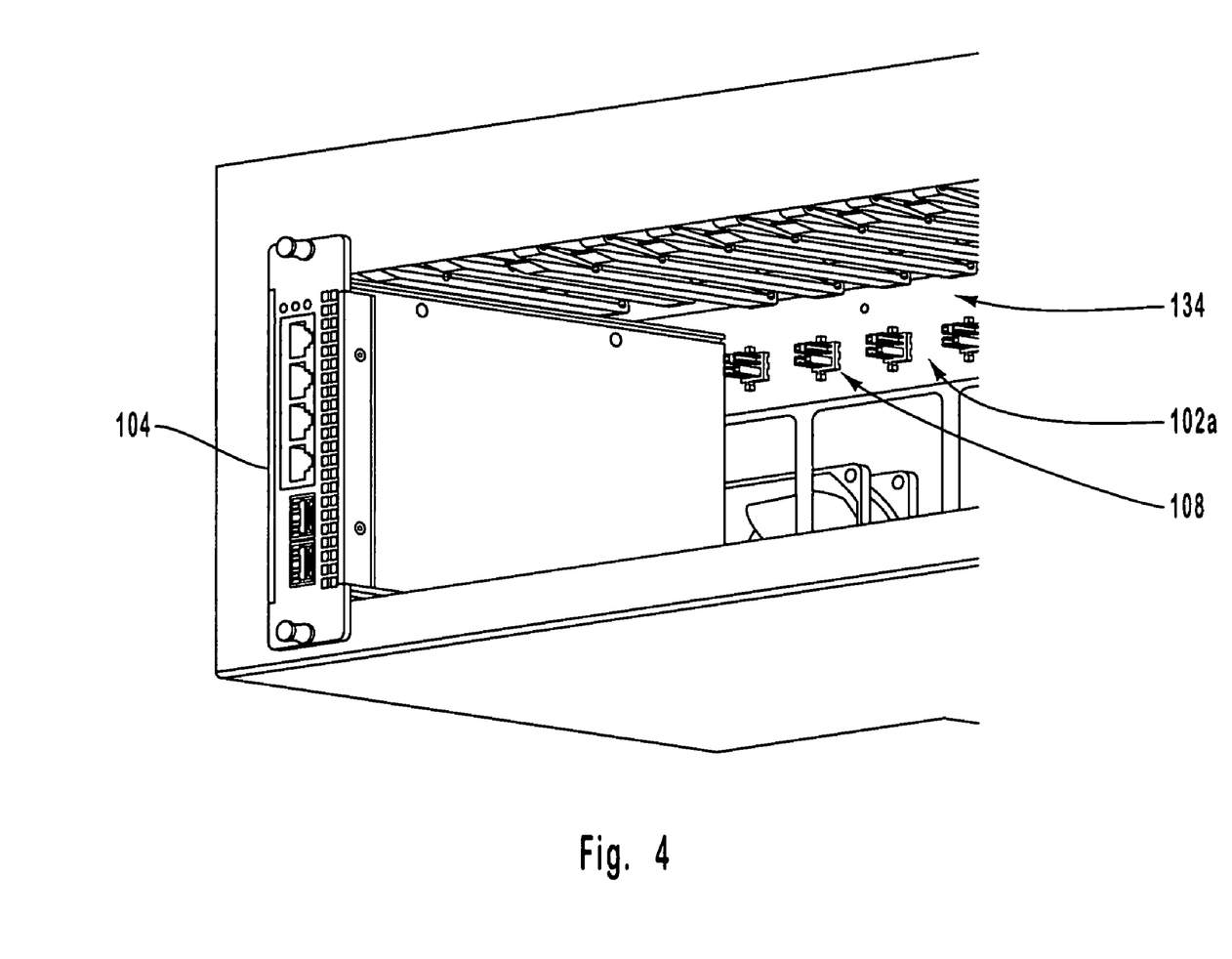
FIG. 4 is a front perspective view of the embodiment of the housing of FIG. 1 with the housing holding only one network tap module.

FIGS. 1–3 illustrate an embodiment of a housing 100 that includes a chassis 102 and a power supply 106. Network tap modules 104 are seen inserted in the housing 100. The card guides allow the network tap modules 104 to be closely packed, while still providing a surface to guide each module as it is inserted into the housing 100. This results in the housing 100 being capable of a high packing ratio. An exemplary embodiment of the displaceable card guide 134 installed in a housing 100 is seen in FIG. 4.

Figure 9:
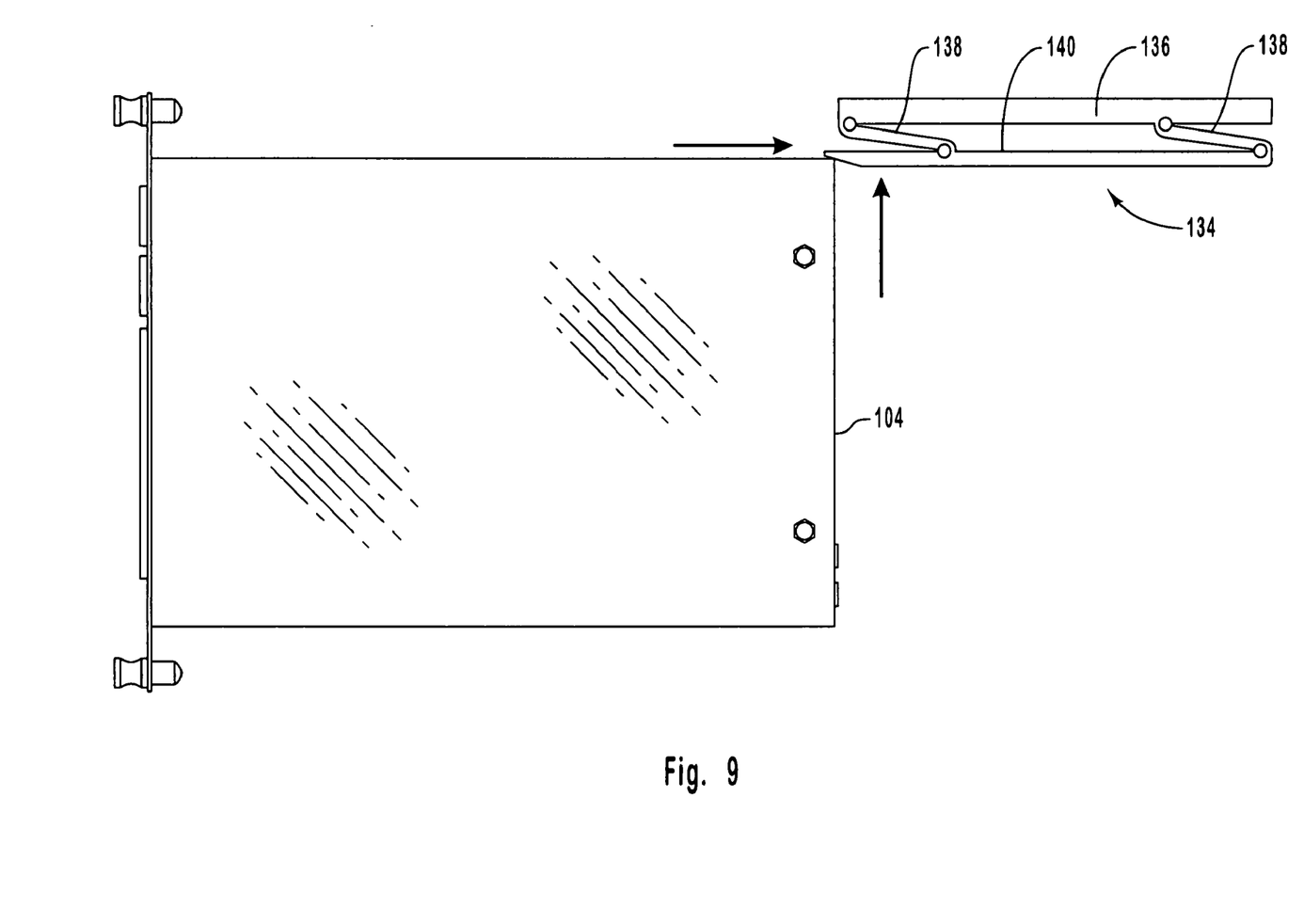
FIG. 9 is a side view of a network tap module being inserted into a housing so as to cause a card guide to retract during insertion.
Figure 10:
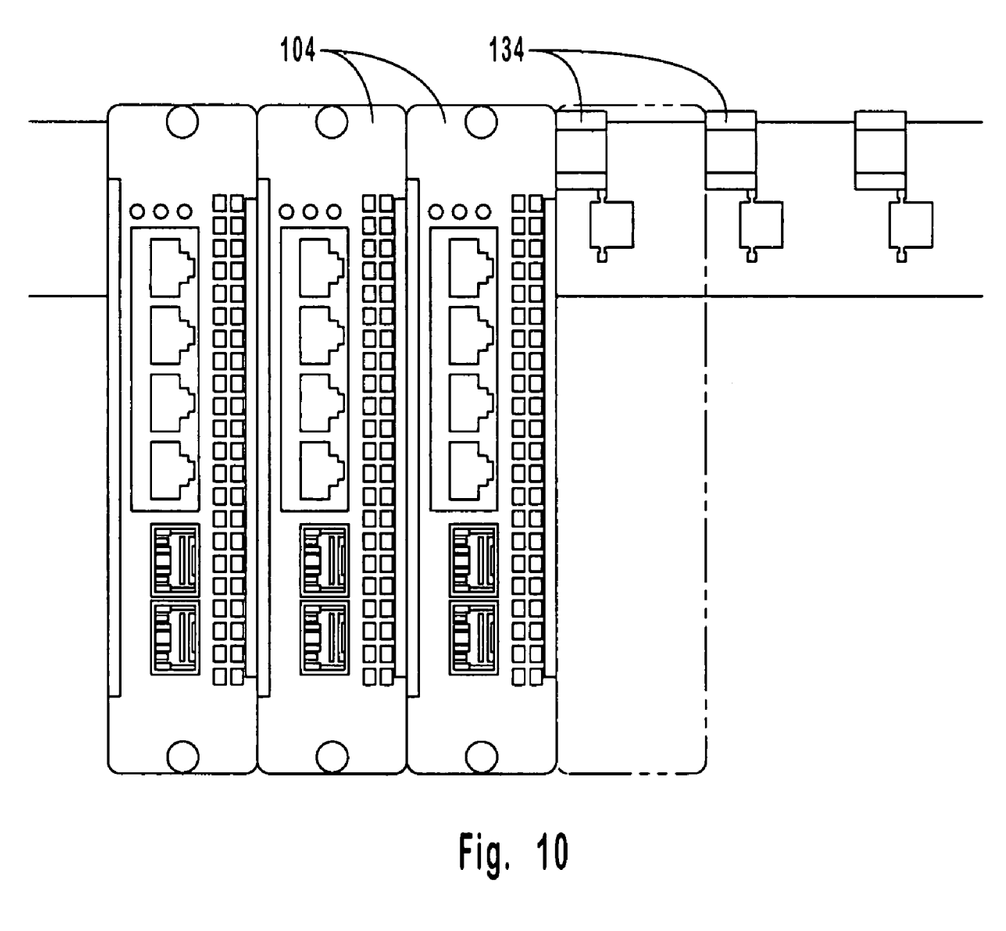
FIG. 10 is a section view showing relative positions of card guides to network tap modules within the housing of FIG. 1.

FIGS. 5–10 illustrate the displaceable card guides 134, which include a base 136, two retractable arms 138, and a guide 140. The base 136 is attached to the inside roof of the chassis 102. A first end of each retractable arm 138 is attached to the base 136, while a second opposite end of each arm 138 is attached to the guide 140. As illustrated in FIG. 9, as the module 104 is inserted, it contacts the sloped leading edge of the guide 140. This contact continues as the module 104 is pushed into the chassis 102 of the housing 100. As the module 104 moved into the chassis 102 in a direction that is substantially parallel to a long axis of the guide 140, the sloped leading edge translates this motion into a force that moves the displaceable card guide to the retracted position.

Figure 5:
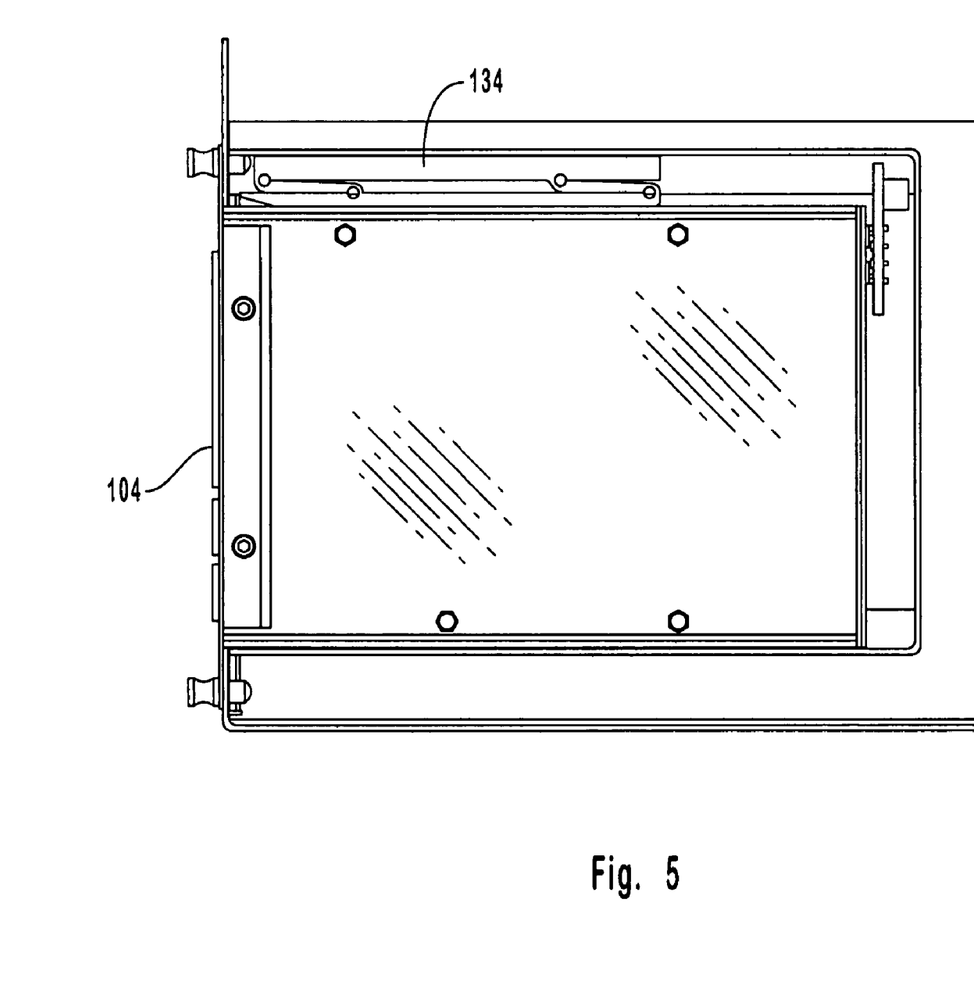
FIGS. 5 and 6 are cross sectional views through a portion of the housing of FIG. 1.
Figure 6:
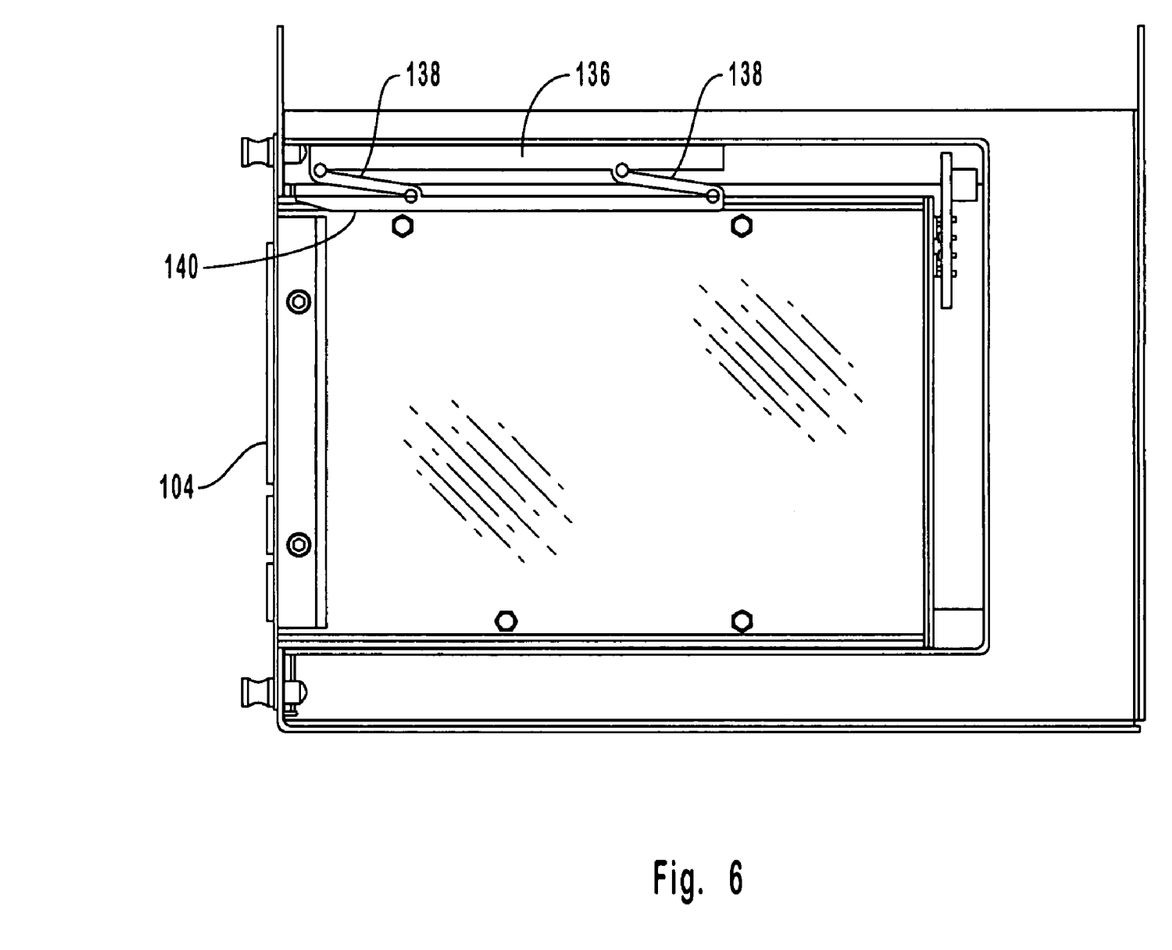
Figure 7:
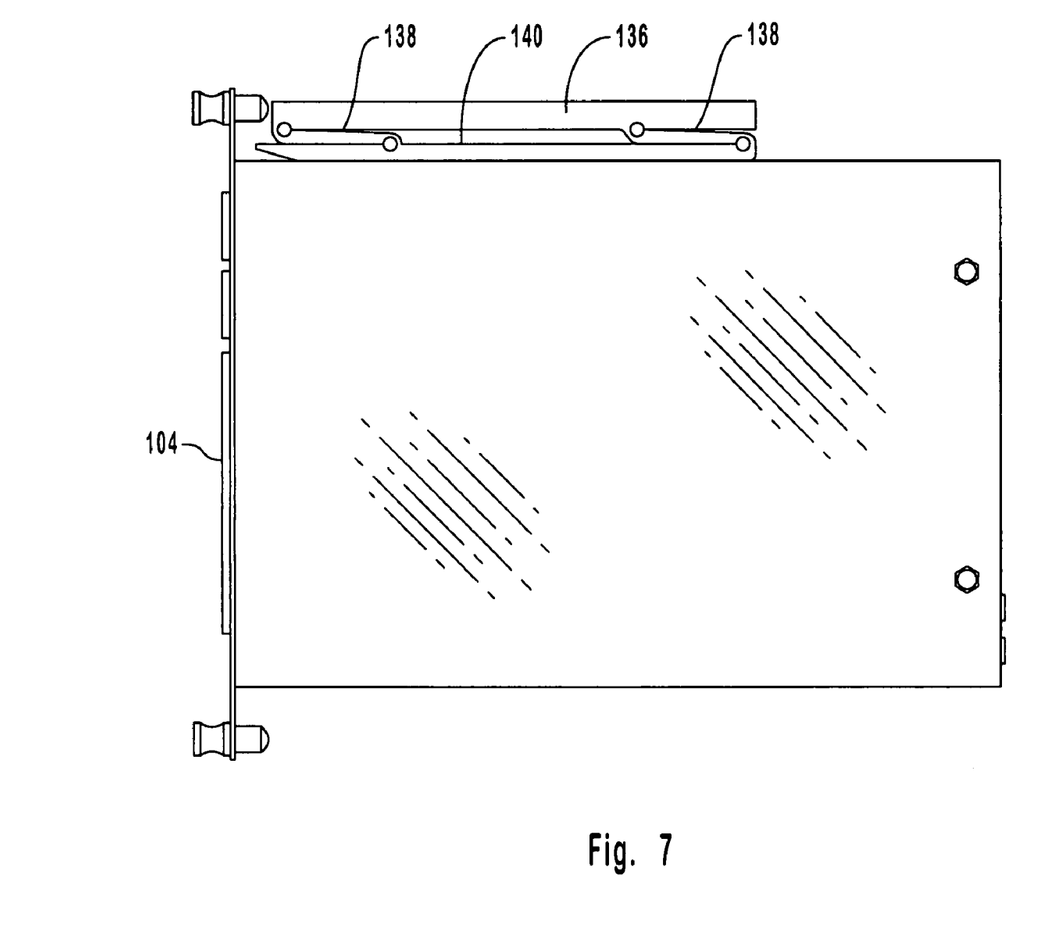
FIGS. 7 and 8 are side views of a card guide in a retracted and extended position.
Figure 8:
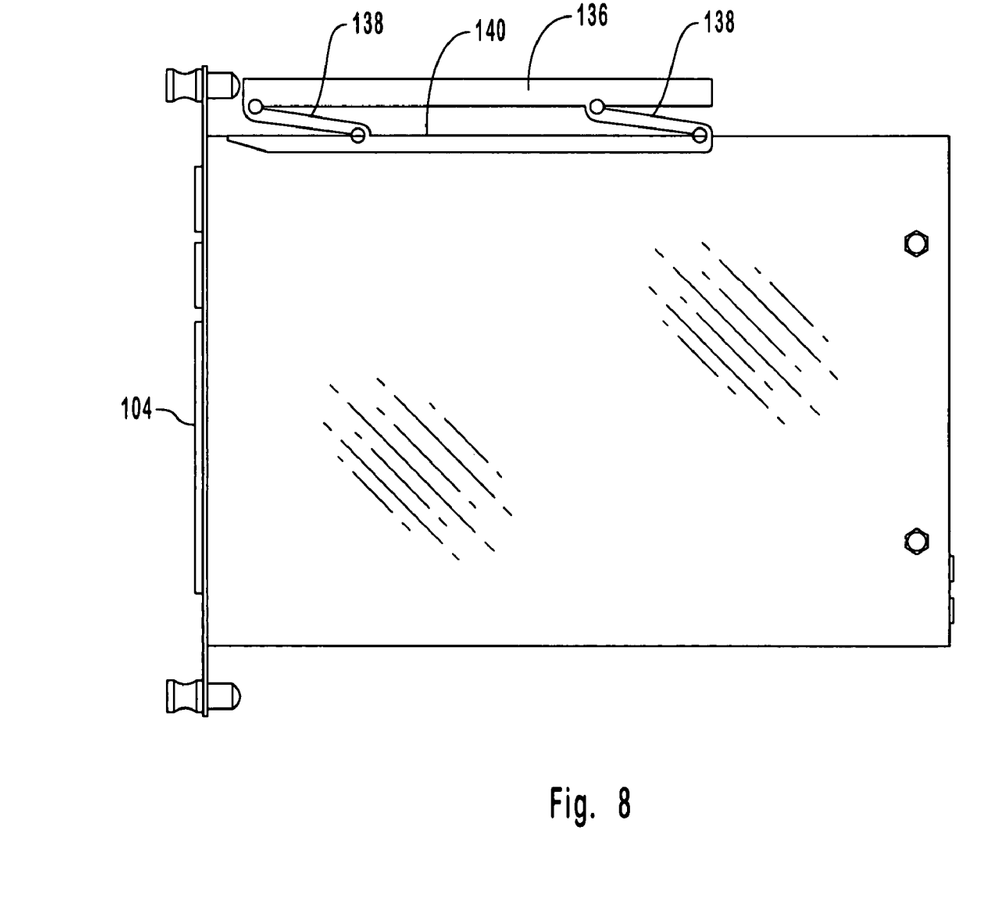

The retractable arms 138 progressively retract to a final position as illustrated in FIGS. 5 and 7. Thus, the displaceable card guides 134 have two primary positions, including an extended position shown in FIGS. 6 and 8, in which the tap position associated with the card guide 134 has not received a tap module 104, and a retracted position, shown in FIGS. 5 and 7, in which the tap position associated with the card guide 134 has received a tap module 104.

The housing 100 includes one card guide 134 associated with each position designed to receive a network tap module 104. The last position does not require a retractable card guide 134 as a tap module 104 may not be inserted beyond that position. A fixed guide, barrier or chassis 102 sidewall may serve in this position. For example, if the housing 100 is designed to receive up to twelve network tap modules 104, it will preferably include eleven retractable card guides 134 and one fixed guide or barrier. A network tap module 104 that is inserted into the housing 100 can be inserted below a displaceable card guide 134 that is adjacent on either side to a combination of 1) card guides 134 in their extended position at tap positions that have not received a network tap module 104, 2) inserted network tap modules 104, or 3) a fixed guide, barrier, or sidewall of the chassis 102. In any of these combinations, the adjacent, structures operate as guides to constrain lateral motion of the network tap module 104 as it is inserted into, withdrawn from, or positioned within the chassis 102. For example, as a module 104 is inserted into the housing 100 at a location adjacent to network tap positions that have not yet received tap modules 104, the card guides 134 on each immediately laterally adjacent side remain in the extended position, acting to guide the module 104 and constrain lateral motion as it moves into the chassis 102 of the housing 100. Likewise, when a module 104 is inserted into the housing 100 at a location adjacent to inserted tap modules 104 or a sidewall of the chassis 102, the inserted tap modules 104 or the sidewall act to guide the module 104 and constrain lateral motion thereof.

Inclusion of the optional displaceable card guides 134 eliminates the need for interior walls or other such guides that would physically separate adjacent network tap modules 104 when inserted into the housing 100. Elimination of such structures allows the housing 100 to have a high packing ratio. Such structures are also difficult to manufacture and subject to being easily damaged due to their high aspect ratio. In summary, the housing 100 provides the ability to locate and maintain a plurality of network tap modules 104 in one location, while also eliminating the need for each module 104 to have its own power supply.

While the invention has been disclosed herein in the context of network tap modules, the retractable card guides of the invention can be readily used with any of a number of different types of pluggable modular electronics or optical components to increase the density by which the components can be received in a housing or chassis. It will also be appreciated that the present invention may be embodied in other specific forms without departing from its spirit or essential characteristics.

What is claimed is:

1. A displaceable card guide for use with a high packing ratio housing for pluggable modular components, comprising:
   a base attached to a top wall of the housing;
   a guide member having a guide surface that is in contact with a pluggable modular component when the pluggable modular component is received in the housing; and
   two retractable arms, wherein a first end of each of the two retractable arms is attached to the base and a second opposite end of each of the retractable arms is attached to the guide member, the two retractable arms permitting the guide member to displace toward the base so as to move the displaceable card guide from a extended position to a retracted position when the pluggable modular component is received in the housing.

2. A displaceable card guide as recited in claim 1, further comprising a lateral surface that operates, when the displaceable card guide is in the extended position, to constrain lateral motion of an adjacent pluggable modular component as the adjacent pluggable modular component is inserted into a position adjacent to the displaceable card guide.

3. A displaceable card guide as recited in claim 1, wherein the guide member has a sloped leading edge.

4. A displaceable card guide as recited in claim 3, wherein the sloped leading edge contacts the pluggable modular component as the pluggable modular component is received in the housing and translates motion of the pluggable modular component that is substantially parallel to a long axis of the guide member into a force that moves the displaceable card guide to the retracted position.

5. A high packing ratio housing having a plurality of displaceable card guides, comprising:
   a chassis having an opening with a plurality of positions that each can receive a pluggable modular component;
   a power supply at least partially disposed within the chassis and connectable to a pluggable modular component; and
   a plurality of displaceable card guides, each card guide corresponding with one of the positions and including:
      a base attached to the inside roof of the chassis;
      a guide member having a guide surface that is in contact with the pluggable modular component when the pluggable modular component is received in the housing; and
      two retractable arms, wherein a first end of each of the two retractable arms is attached to the base and a second opposite end of each of the retractable arms is attached to the guide member.

6. A high packing ratio housing as recited in claim 5, wherein the two retractable arms permit the guide member to displace toward the base so as to move the displaceable card guide from an extended position to a retracted position when the pluggable modular component is received in the housing.

7. A high packing ratio housing as recited in claim 6, wherein each of the plurality of displaceable card guides includes a lateral surface that operates, when each displaceable card guide is in the extended position, to constrain lateral motion of an adjacent pluggable modular component as the adjacent pluggable modular component is inserted into a position adjacent to the displaceable card guide.

8. A high packing ratio housing as recited in claim 5, wherein the plurality of displaceable card guides comprises eleven displaceable card guides.

* * * * *